United States Patent [19]
Petersen

[11] Patent Number: 5,472,242
[45] Date of Patent: Dec. 5, 1995

[54] END-FITTING FOR PIPE CONNECTION HAVING PROPER INSERTION INDICATOR

[76] Inventor: Horst U. Petersen, 615 Millpark Drive, Kitchener, Ontario, Canada, N2P 1V4

[21] Appl. No.: 265,116

[22] Filed: Jun. 24, 1994

[51] Int. Cl.⁶ .................................................. F16L 37/00
[52] U.S. Cl. .......................... 285/93; 285/305; 285/921; 285/321
[58] Field of Search ............................. 285/93, 305, 308, 285/321, 921

[56] References Cited

U.S. PATENT DOCUMENTS

| | | | |
|---|---|---|---|
| 1,159,845 | 11/1915 | Kidd | 285/93 |
| 3,315,990 | 4/1967 | Kramer | 285/81 |
| 3,584,902 | 6/1971 | Vyse | 285/305 |
| 3,625,551 | 12/1971 | Branton | 285/305 |
| 4,471,978 | 9/1984 | Kramer | 285/93 |
| 4,707,000 | 11/1987 | Torgardh | 285/305 |
| 4,884,829 | 12/1989 | Funk et al. | 285/305 |

FOREIGN PATENT DOCUMENTS

| | | | |
|---|---|---|---|
| 215389 | 9/1941 | Switzerland | 285/93 |
| 1213414 | 11/1970 | United Kingdom | 285/93 |

*Primary Examiner*—Eric K. Nicholson
*Attorney, Agent, or Firm*—Anthony Asquith & Co.

[57] ABSTRACT

For use in push-in-and-snap pipe connectors, the region of the pipe behind the integral end-flange is raised in diameter. If the pipe is properly inserted, the raised region is concealed inside the body of the fitting; but if the pipe is not pushed fully home into the body, the raised region is visible, and serves to alert the production-line inspector that the joint is not sealed. A snap-in sping clip holds the pipe in the body, and the clip rests against the raised protion to minimise the chance of vibration noise. The flange and raised region are formed in the pipe by axial-press punches and dies.

9 Claims, 3 Drawing Sheets

1

END-FITTING FOR PIPE CONNECTION HAVING PROPER INSERTION INDICATOR

This invention relates to end-fittings for pipes, being pipes, for example, for the transmission of lubricating oil in automotive engines.

BACKGROUND TO THE INVENTION

It is the conventional practice in the manufacture of oil pipes in automotive engines to braze end-fittings onto the lengths of pipe. The end-fitting includes a forward-pointing nose, backed by an enlarged portion. Conventionally, behind the enlarged portion of the end-fitting is a threaded nut, which engages a complementarily-threaded hole in the engine block or other component into which the pipe is fitted.

An automotive engine is a demanding environment, in that the inevitable vibrations, temperature extremes, etc, can tend to make a threaded fastener work loose. And, from a service standpoint, oil-pipes are expected never to work loose throughout the whole life of the vehicle. If an end-fitting works loose, and the lubricating oil leaks out, the engine may be destroyed.

Bearing in mind these factors, it is the common practice for the designer to "over-engineer" the end-fittings on oil-pipes. Penny-pinching on oil-pipe end-fittings has been seen as imprudent. As a result, oil-pipe end-fittings have been produced more expensively than is now seen to be necessary.

The designer has also had to bear in mind that the installation of, for example, an oil-pipe into an engine-block, on the engine-building production line, requires careful attention, and the exercise of some degree of skill, on the part of the installation operative, and such attention and skill cannot always be totally relied upon. Even though the end-fitting may be highly robust and effective in itself, if the end-fitting is not properly installed, oil may leak out.

Designers often prefer to consider, for such applications as automotive oil-pipes, connectors which have, not a screw-thread type of connection, but a push-in-and-snap type of connection. When a push-in-and-snap connection is properly engineered, the connection can be just as reliably secure against leakage as a screw-thread type of connection, but can be more economical to manufacture, and require less skill and attention from the assembly operative.

The invention is aimed at providing a highly reliable end-fitting for a pipe, wherein the end-fitting, having been properly installed, is the equal of conventional end-fittings from the standpoint of resistance to leakage during service; wherein the end-fitting is almost impossible to be assembled improperly on the production line; and wherein the end-fitting is highly economical to produce.

For a robust and secure attachment of the end fitting, the designer requires that the diameter of the enlarged portion be considerably larger than the nominal diameter of the pipe. As mentioned, the conventional practice has been to braze the end-fittings onto the pipe. A brazed-on end-fitting may be made as a lathe-turned component in brass, which is brazed to the (steel) pipe.

However, it is now becoming standard practice to swage the end of the pipe itself to form the end-fitting. One of the problems when swaging the end-fitting is to provide enough local enlargement of the diameter of the pipe as to provide a good abutment upon which a pipe-nut can engage, and be tightened down, or against which a snap-clip can engage.

If the designer calls for too much enlargement by swaging, the pipe material may start to pucker, or otherwise distort, which might lead to a faulty seating of the end-fitting, and a consequent leakage of oil at the joint.

BRIEF DESCRIPTION OF THE INVENTION

The invention provides a means for indicating to an inspector whether the pipe has been assembled properly into the joint, whereby the designer can be assured that the inspector will discover any mis-installed joints (which could cause loss of oil). The invention provides a shape or form on the pipe, which serves as a witness to the fact that the pipe has been assembled properly: if the witness is visible, the inspector must call for the joint to be re-made.

DETAILED DESCRIPTION OF PREFERRED EMBODIMENT

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1A:
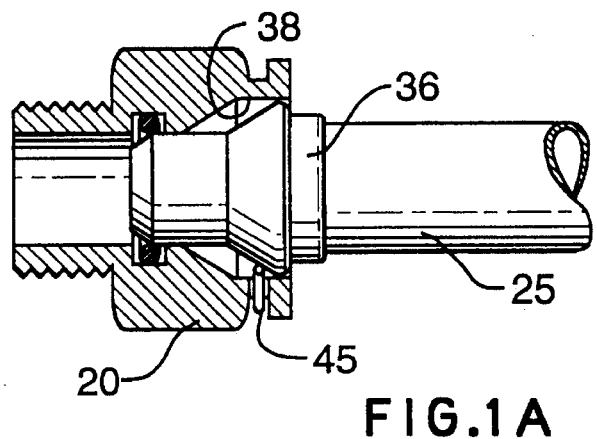
FIG. 1A is a section corresponding to FIG. 1, in which the pipe is only partially installed.
Figure 1:
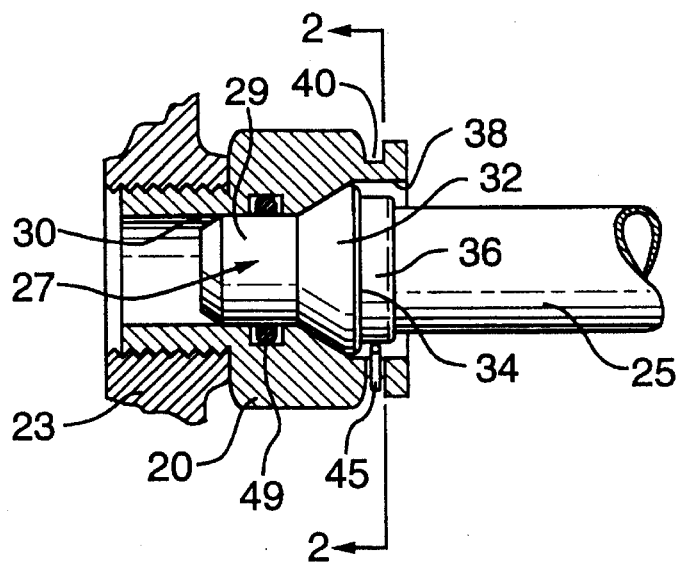
FIG. 1 is a cross-section of a pipe having an end-fitting in accordance with the invention, and installed in an automotive engine.

FIG. 1 shows a body 20, which is screw-threaded into a cast-iron or aluminum engine block 23. (The function of the body 20 could be provided directly in the material of the block, but, when that is done, often any economies in material saved are generally offset by the reduction in design flexibility.)

The oil-pipe 25 has an end-fitting 27. The end-fitting includes a forward-pointing nose 29, the leading end of which is slightly chamfered inwards, at 30. Behind the nose is a tapered section 32, which terminates abruptly at a rearward-facing flat abutment wall 34.

Behind the wall 34 is an increased-diameter "witness" portion 36, which will be described below.

The body 20 is formed with a hollow interior of complementary shape to the end-fitting 27. The hollow interior includes an open-tubular-portion 38, having an axial length L. The body includes a groove 40, in which have been cut three through-slots 43, which extend through the base of the groove and into the portion 38.

Figure 2:
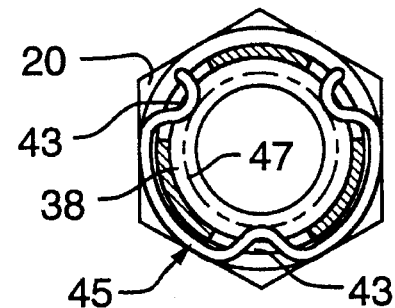
FIG. 2 is an end elevation of the end-fitting shown in FIG. 1.

A wire spring-clip 45 is fitted into the groove 40, and is so shaped as to pass into and through the three slots 43. This is shown in FIG. 2. (In FIG. 2, the tube 25 has been omitted; the dotted line 47 indicates the diameter of the witness portion 36; when the pipe 25 is present, the innermost extremities of the spring-clip 45 engage the portion 36.)

The portions of the spring-clip 45 that protrude through, and inside the tubular portion 38 of the body 20, serve to engage the wall 34. With the clip in place, the pipe 25 cannot be withdrawn from the body 20. It will be understood, however, that the pipe 25 may be pressed into, and assembled into, the body 20 even though the spring-clip 45 is present, because the tapered section 32 of the end fitting can expand the spring-clip as it passes through.

The production line operator generally can "feel" the snap as the wire spring-clip 45, having risen up the tapered section 32, snaps over the abutment wall 34, as he inserts the pipe into the body 20. Feeling the snap alerts him to the fact that the pipe has been properly assembled.

However, it has been found that it is possible for the operator to leave the pipe only half-assembled. The operator thinks the pipe has snapped into place, when it has not. The pipe could be only partially engaged, and yet the engagement is sufficient that the operator, and the production line inspector, unless especially conscientious, could miss the fact that the engagement is only partial. The pipe could be assembled into the body in such a way that the inspector can even give the pipe a tug, and can believe the resistance of the pipe to the tug to be an indication that the pipe is fully engaged.

Thus, although the snap action of the spring clip can give the operator the signal that the pipe has been properly inserted, there is no corresponding signal which the inspector can use. The inspector finds it difficult to check or inspect whether the pipe is fully inserted. It is easy enough for the operator to engage the pipe in the body, but it is not so easy for the inspector to determine whether the engagement is complete or not.

What happens when the pipe engagement is not quite complete is that the spring clip is hung up on the tapered portion, not having snapped over the abutment wall. When the engine is started, and the oil pressure builds up, the joint leaks, and it can happen that all the oil leaks out whereby the engine is left with no lubricant.

One of the problems with push-in-and-snap connectors for such applications as oil pipes is that it is so difficult to tell whether the joint has been properly assembled. With a screw-thread connection, an inspector can determine whether the components are tight: the inspector can easily determine, by grasping the components, whether the joint is loose. But a push-in-and-snap connection tends to be loose, in the sense that the components can be moved with the fingers, relative to each other, even when the joint is properly made.

The push-in-and-snap type of joint between the pipe and the body is fine, in itself, so long as it is assembled properly. And, once the spring-clip is seated behind the abutment wall, the joint can never work loose (which cannot be said of a screw thread).

When the push-in-and-snap joint is properly assembled, the pipe is free to move and rotate. It is not a good practice to allow the O-ring seal 49 to be subject to physical movement while under hydraulic pressure, but in fact movement at the seal face does not happen, even though the joint is not locked up tightly. The looseness of the joint serves to accommodate distortions of the pipe due to thermal expansion, vibrations, and the passage of time, but such movements as do take place between the pipe and the body are generally not of the seal-cycling kind.

Thus the joint is of the kind in which, when the pipe is properly and fully engaged and assembled, the pipe is loose and free to rotate and to move bodily a short distance in and out, relative to the body, even though the joint is perfectly well assembled and installed. This fact exacerbates the inspection problem. The inspector's task is very difficult, given that the joint is loose even when properly assembled. It should be borne in mind also that the inspector only has a second or two to check that the pipe is properly assembled.

The provision of the witness portion 36 of increased diameter greatly assists the inspector in determining whether the pipe is fully assembled into the body. If the pipe is fully assembled, the witness portion 36 is barely, if at all, visible, deep inside the tubular portion 38 of the body. If the pipe joint is not fully assembled, on the other hand, the portion 36 is readily visible outside the body, and serves as a witness to the fact that the pipe has not been properly inserted.

The witness portion 36 therefore is a particularly effective aid to the reliability with which joints of the type described can be assembled. Even the most cautious chief engineer, responsible for ensuring proper engine lubrication, can come to rely with confidence on a joint which includes a witness to indicate when the joint is properly assembled.

Furthermore, the witness portion 36 may be painted a prominent colour, if desired.

The witness portion 36 provides the designer with the production-line-economy and convenience of the push-in-and-snap connection, but provides him also with an answer to what has been seen as a key disadvantage of push-in-and-snap connections; namely, excellent inspectability.

It will be understood that the spring-clip 45 is pre-assembled into the groove 40, and into the slots 43, before the nose of the pipe is entered into the body. Manual finger pressure is all that is required of the production-line operator to insert the pipe, causing the spring clip to ride over the tapered section 32.

The spring-clip 45 may be taken out to allow the pipe to be withdrawn for servicing purposes, if need be; however, the intention would normally be that the joint would outlast the engine without needing to be serviced.

Figure 3:
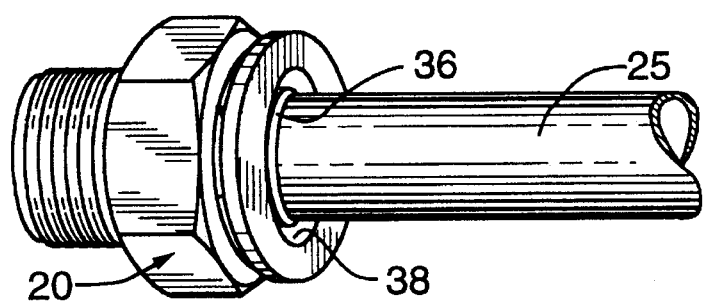
FIG. 3 is a pictorial view of the end-fitting of FIG. 1.
Figure 6:
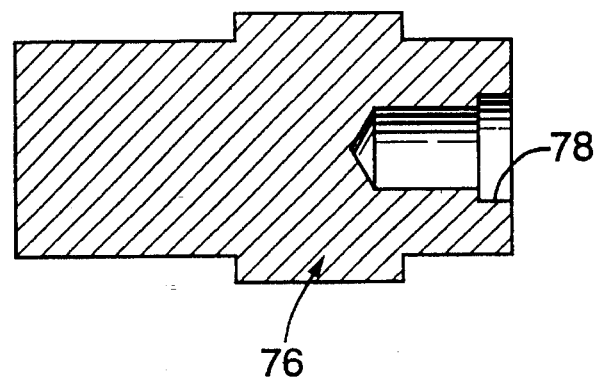
FIG. 6 shows a third punch, used at a third stage of the manufacture.
Figure 5:
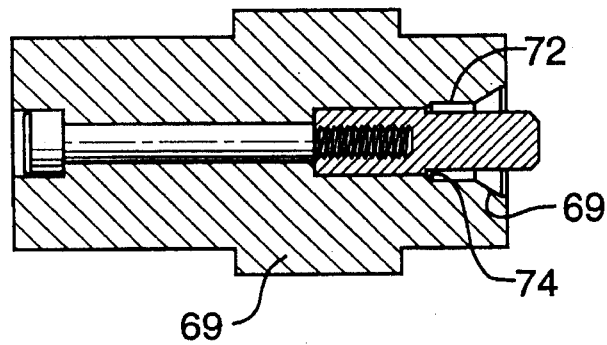
FIG. 5 shows a second punch, used at a second stage of the manufacture.
Figure 4:
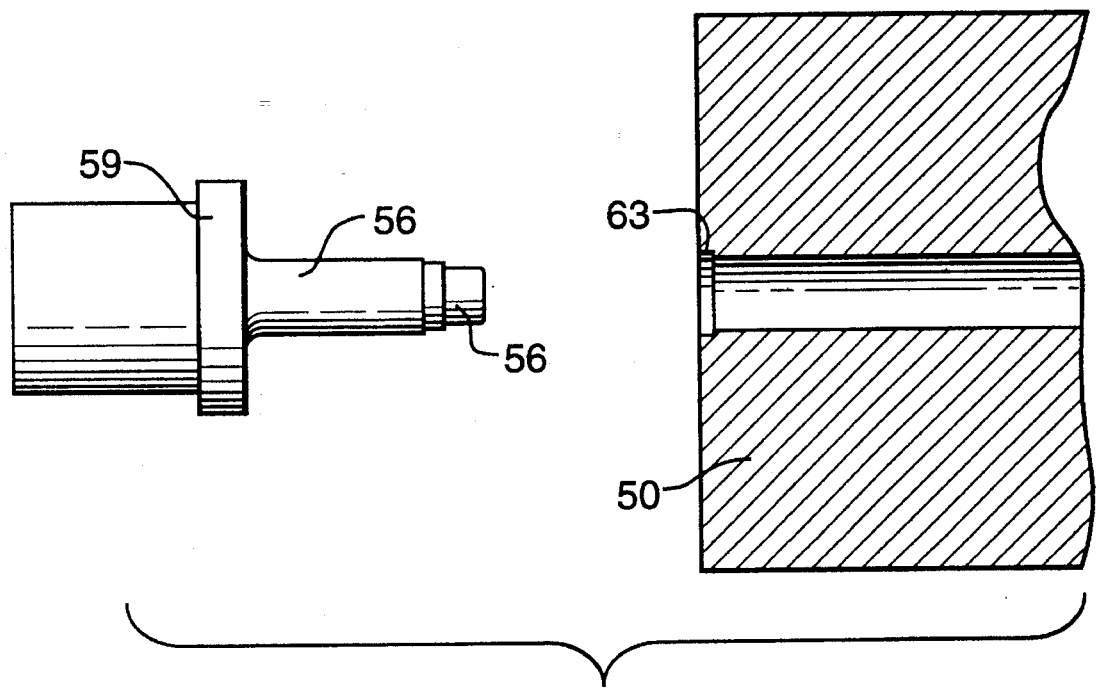
FIG. 4 is a cross-section of a punch and die combination used in the manufacture of the end-fitting shown in FIGS. 1–3.

As mentioned, the end-fitting may be manufactured as a separate component from the pipe, and brazed on. Preferably, however, the end-fitting is formed in the material of the pipe itself. The end fitting as illustrated in FIGS. 1–3 is quite difficult to manufacture in a cylindrical pipe, because of the abrupt corners and gross changes in diameter. One of the problems is that the material tends to fold and pucker when undergoing such disruptive manipulations. The manner of manufacture of the end-fitting will now be described.

FIGS. 4 to 8 show the various stages in the production of the end-fitting illustrated in FIGS. 1 to 3. The production apparatus includes a die 50, having two jaws which are pressed together to clamp a length of pipe 52. An end of the pipe is left protruding from the jaws, and is engaged by a punch 54. A nose 56 on the end of the punch 54 enters the pipe 52 first, and then an intermediate step 58 enters the pipe, and then a stem 60 enters the pipe. Thus the end of the pipe is swaged out in diameter by the punch 54.

Figure 7:
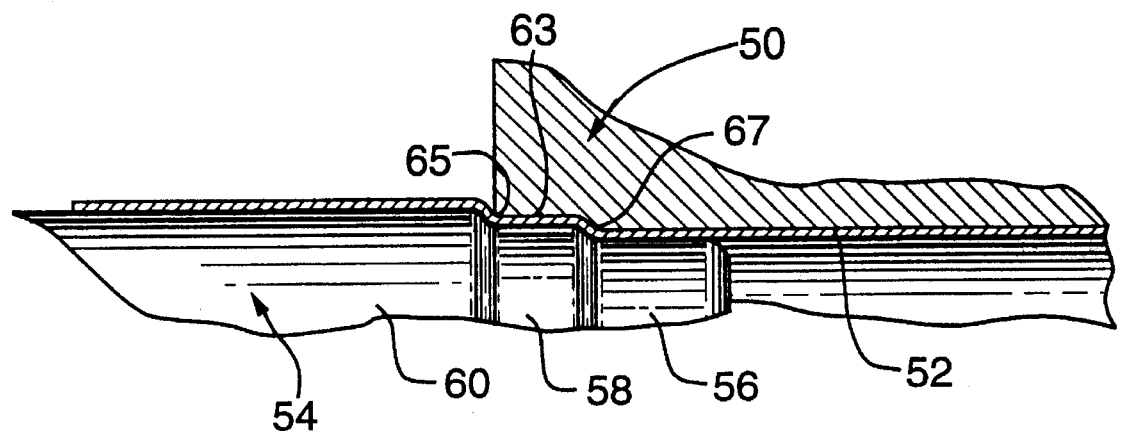
FIG. 7 shows the first punch in use.
Figure 8:
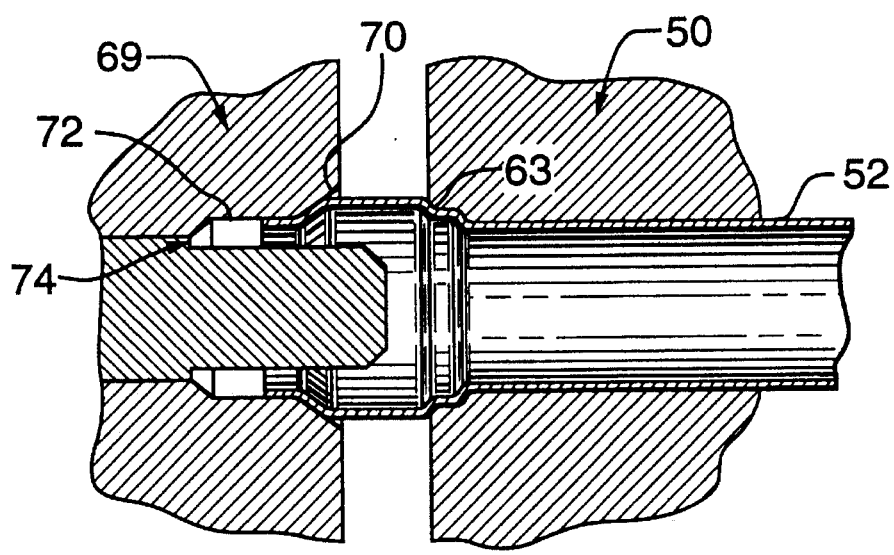
FIG. 8 shows the second punch in use.

The die 50 is formed with a recess 63. The punch 54 is so shaped as to trap the thickness of the pipe wall between the punch and the die over the area of the intermediate step 58. The shape is such that the pipe wall is compressed between the punch and die most heavily at the locations of the changes in diameter. Thus, the inside and outside faces of the pipe wall are coined between the punch and the die, particularly at the corners 65,67 as shown in FIG. 7.

One of the key factors in providing the shape of the illustrated end fitting lies in the heavy contact between the inside surface of the pipe wall at the corners 65,67. This may be contrasted with conventionally-designed swaging operations, where there would be no heavy contact between the punch and the inside wall of the pipe. The heavy contact has the effect of conditioning the inside of the pipe wall, rendering it significantly less likely to pucker or otherwise distort during the manipulations of the pipe wall.

It will be understood that the pipe wall, having been swaged outwards by the operation of the punch 54, has to be swaged back inwards again so that the diameter of the nose 29 is more or less the same as the nominal diameter of the pipe 25. In fact, first expanding the pipe, and then reducing the diameter of the pipe, is the key to successfully manufacturing the end-fitting 27 actually in the material of the pipe: it will be understood that the highly advantageous coining of the corners from the inside was only able to be carried out because, at the time, the inside of the pipe was accessible, and reachable, due to the pipe having been swaged out to a larger diameter.

The punch 54 is withdrawn, and a second punch 69 is brought to bear. The expanded diameter of the pipe engages the tapered section 70 of the punch 69, and is reduced. The end of the pipe proceeds into the plain-cylindrical recess 72 in the punch 69 until the tip of the pipe reaches the abutment 74. Now, further movement together of the punch and die causes the wall of the pipe to collapse. The pipe collapses in the axial direction, and the only place for the material of the pipe wall to go is outwards into the tapered section 70.

It will be understood that the punch 69 cannot be in direct contact with the inside surface of the wall of the pipe inside the zone of the pipe that is undergoing expansion into the tapered section: only the outside of the pipe wall can be touched at this critical time. However, because the insides of the corners 65,67 had been conditioned by the earlier coining operation, the corners are substantially perfectly formed and ready to accommodate the gross changes without spurious distortion, and in particular without puckering.

The second punch 69 is withdrawn, and a third punch 76 brought to bear. The purpose of the third punch is to ensure good dimensional accuracy and consistency. The cylindrical surface of the nose 29 of the end-fitting, which is the surface against which the O-ring 49 will seal, is a key dimension, and this surface is conditioned by the final punch 76. Also, it must be ensured that the outer diameter 78 of the tapered section 32 of the end-fitting does not exceed a predetermined value, and again this outer diameter is conditioned by the final punch, as will be understood from a perusal of FIG. 6.

The punch press on which the above operations are carried out is arranged so that the three punches are addressed to the pipe end in 1-2-3 sequence. This can be done by mounting the punches on a capstan, and indexing the punches into operation in sequence. Or, it can be arranged that the die is on a capstan, and the die is indexed from punch to punch. For rapid production rates, it is preferable that the press be arranged to work all three punches at every stroke.

As shown in FIG. 7, both of the two corners 65,67 are coined (from the inside) at the same time. This may be difficult to achieve, given that steel pipe can vary as to dimensional accuracy, and given that of course the punches and dies do tend to wear. Alternatively, two separate punches may be used in place of the single first punch 54. In this case, the manufacture of the end-fitting takes four strokes of the press, not three, but the benefit is that each corner is coined individually.

If, for reasons of economy, the three-stroke operation is preferred, the designer should design the punches and dies such that the corner 65 receives priority coining treatment over corner 67. Corner 65 marks a much more disruptive change in configuration than corner 67, and if the material has a tendency to pucker at all it will pucker around corner 65—unless the precaution of ensuring a thorough coining of the corner 65 is taken.

As mentioned, the witness portion 36 of the end fitting may be coloured, and this is done by circling the portion with a ring of paint. Of course, the paint is applied after the end fitting has been formed. The painting operation may be carried out using an attachment mounted actually in the press, in order to minimise pick-up-and-handling operations involving the pipe, although any lubricants used in the punches and dies would need to be cleansed off the pipe before painting.

As described, the prime purpose of the witness portion 36 is to provide ready confirmation that the pipe has been inserted properly, and, equally, to alert the inspector on the production line when the pipe has not been inserted properly. The raised witness portion 36 also serves another purpose, as follows.

It is preferred that, during insertion of the pipe 25 into the body 20, the radially-innermost extremities of the wire spring-clip 45 should not contact the nose 29. If such contact were to occur during assembly, the cylindrical sealing surface on the nose might be scratched and damaged by the spring-clip. On the other hand, the designer should see to it that the spring-clip be not too loose after installation, since if the clip were free to vibrate it could produce an annoying buzzing sound. To avoid such annoyance, therefore, it is preferable that, after installation, the spring clip rests against a firm abutment.

The presence of the raised witness portion 36 provides such an abutment. Without the raised witness portion, the designer has to compromise between arranging either that the spring-clip is loose, and can rattle, or that the spring-clip touches the main diameter of the pipe, in which case the spring-clip would inevitably also touch the sealing surface of the nose. With the raised witness portion, the inner extremities of the spring-clip rest against the raised witness portion, thus reducing the compromise.

I claim:

1. Pipe-end fitting, of the push-in-and-snap type, wherein:

the fitting includes a pipe of a nominal diameter;

the pipe has a flange, having a rearwards-facing flange-surface;

the flange is of a substantially larger outer diameter than the nominal diameter;

the pipe is formed with a raised-portion, having a diameter intermediate between the outer diameter of the flange and the nominal diameter of the pipe, and the raised-portion of the pipe extends back from the rearward-facing flange-surface an axial distance L;

the fitting includes a body, into and from which the pipe may be inserted and removed;

the body is formed with an internal-cavity-surface, of a larger diameter than the diameter of the flange;

the internal-cavity-surface is of such a long axial length that, when the pipe is fully inserted into the body, substantially the whole axial length L of the raised-portion of the pipe lies substantially inside the internal-cavity-surface, whereby the raised-portion of the pipe, when the pipe is fully inserted into the body, is substantially hidden from view;

the internal-cavity-surface is of such a short axial length that, under all conditions in which the pipe is only partially, and not fully, inserted into the body, at least a portion of the length L of the raised-portion of the pipe protrudes axially outside the cavity surface, whereby the protruding length is visible, and serves as a witness to the fact that the pipe is not fully inserted into the body;

the flange on the pipe-end is of the kind that was formed directly in the material of the pipe by axially forcing the end of the pipe into a hollow die.

2. A fitting as claimed in claim 1, wherein the raised portion is of substantially constant diameter along the length thereof.

3. A fitting as claimed in claim 1, wherein the fitting includes a spring-clip, which resides in the body, and which is engageable with the rearwards-facing flange-surface when the pipe is fully inserted in the body.

4. A fitting as claimed in claim 3, wherein:

the flange has a forward-facing flange-surface, and the forward-facing flange surface is tapered;

the forward-facing flange-surface is tapered in such a manner that as the pipe is inserted into the body, the spring-clip rides up the taper and is forced to expand, whereby, upon full insertion of the pipe into the body, the spring-clip passes over the outer diameter of the flange, and snaps into locking engagement with respect to the rearward-facing flange-surface.

5. Pipe-end fitting, of the push-in-and-snap type, wherein;

the fitting includes a pipe of a nominal diameter;

the pipe has a flange; having a rearwards-facing flange surface;

the flange is of a substantially larger outer diameter than the nominal diameter;

the pipe is formed with a raised-portion, having a diameter intermediate between the outer diameter of the flange and the nominal diameter of the pipe, and the raised-portion of the pipe extends back from the rearward-facing flange-surface an axial distance L;

the fitting includes a body, into and from which the pipe may be inserted and removed;

the body is formed with an internal-cavity-surface, of a larger diameter than the diameter of the flange;

the internal-cavity-surface is of such a long axial length that, when the pipe is fully inserted into the body, substantially the whole axial length L of the raised-portion of the pipe lies substantially inside the internal-cavity-surface, whereby the raised-portion of the pipe, when the pipe is fully inserted into the body, is substantially invisible;

the internal-cavity-surface is of such a short axial length that, under all conditions in which the pipe is only partially, and not fully inserted into the body, at least a portion of the length L of the raised-portion of the pipe protrudes axially outside the cavity surface, whereby the protruding length is visible, and serves as a witness to the fact that the pipe is not fully inserted into the body;

the fitting includes a spring-clip, which resides in the body, and which is engageable with the rearwards-facing flange-surface when the pipe is fully inserted in the body;

the flange has a forward-facing flange-surface, and the said surface is tapered;

the forward-facing flange-surface is tapered in such a manner that as the pipe is inserted into the body, the spring-clip rides up the taper and is formed to expand, whereby, upon full insertion of the pipe into the body, the spring-clip passes over the outer diameter of the flange, add snaps into locking engagement with respect to the rearward-facing flange-surface;

the spring-clip has springy arms, which, in the spring-clip, are resiliently biassed to a diameter smaller than the diameter of the raised-portion, and the arms, when the pipe is fully inserted, rest on, and touch, the raised-portion.

6. A fitting as claimed in claim 1, wherein:

a nose of the pipe is formed with a cylindrical sealing surface, and the body is fitted with an elastomeric seal;

the seal is secured in the body in such a manner, and is so dimensioned, that when the pipe is inserted into the body, the nose enters, and makes sealing contact with, the seal;

the raised-portion is of a diameter greater than the cylindrical sealing surface.

7. A fitting as claimed in claim 1, wherein the raised portion is provided with a surface coating of such visual contrast to the pipe and the body as to enhance the visibility the raised-portion has when the pipe is not fully inserted into the body.

8. A fitting as claimed in claim 7, wherein the raised-portion is painted.

9. A fitting as claimed in claim 1, wherein the fitting is of the kind in which a nose at the end of the pipe was swaged outwards to a diameter greater than the nominal diameter, then the junction between the rearwards-facing flange-surface and the raised portion of the pipe was axially punch-coined from inside the pipe against a complementary die, and then the nose was reduced in diameter.

\* \* \* \* \*